W. T. HOOFNAGLE.
MEANS FOR SEPARATING MIXED GASES.
APPLICATION FILED MAY 6, 1912.
1,056,026.
Patented Mar. 18, 1913.
2 SHEETS—SHEET 1.
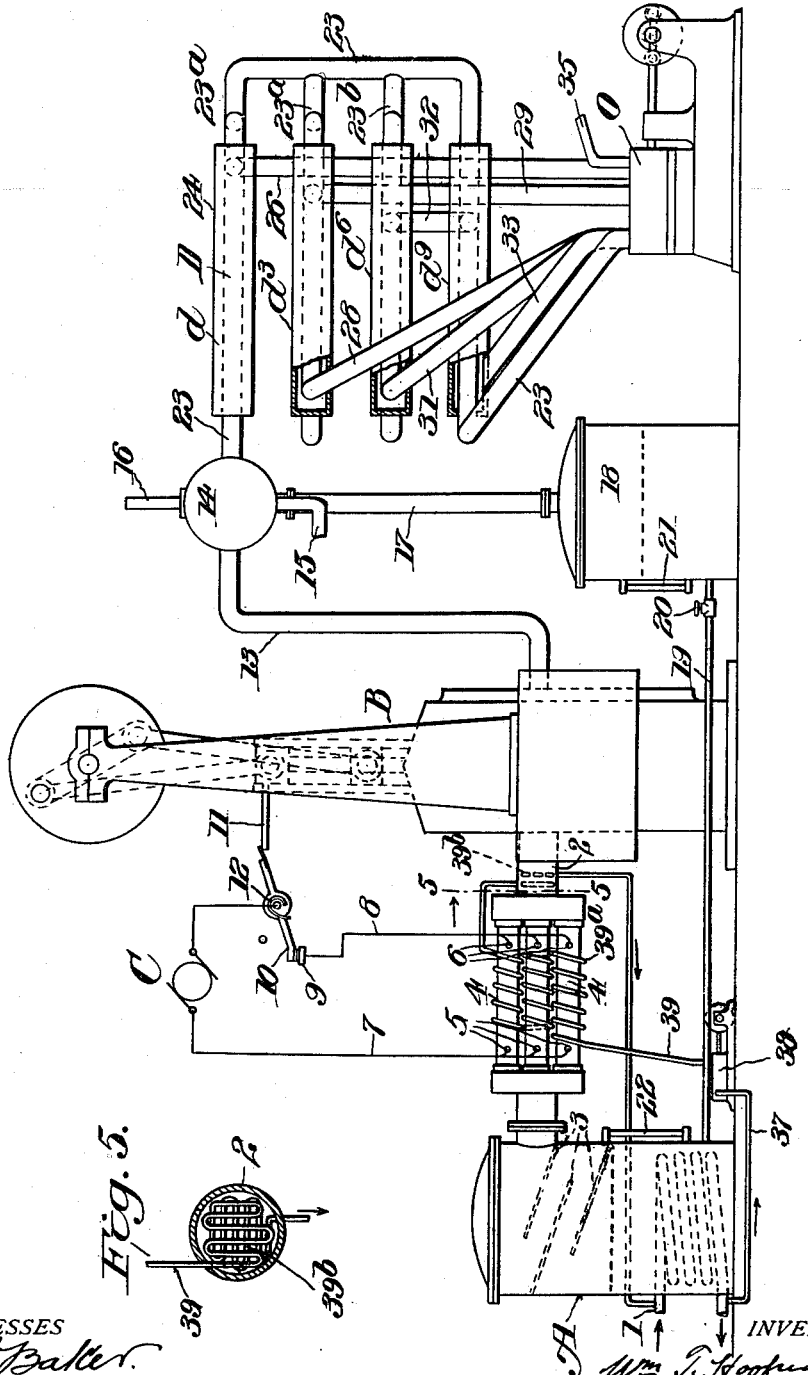
WITNESSES
INVENTOR
Wm T. Hoofnagle
By Watson Bayden
Attorneys

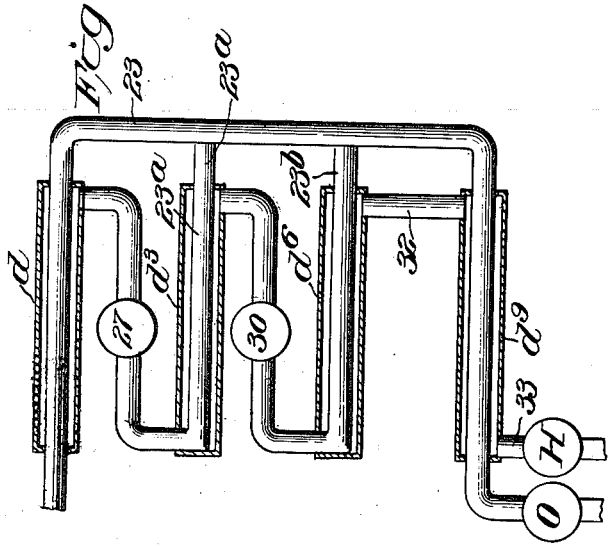
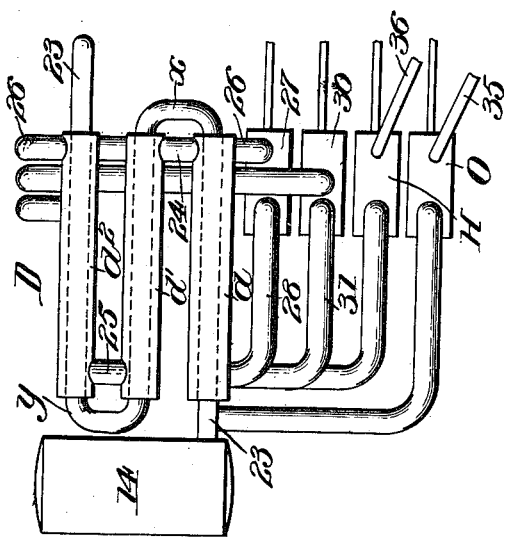
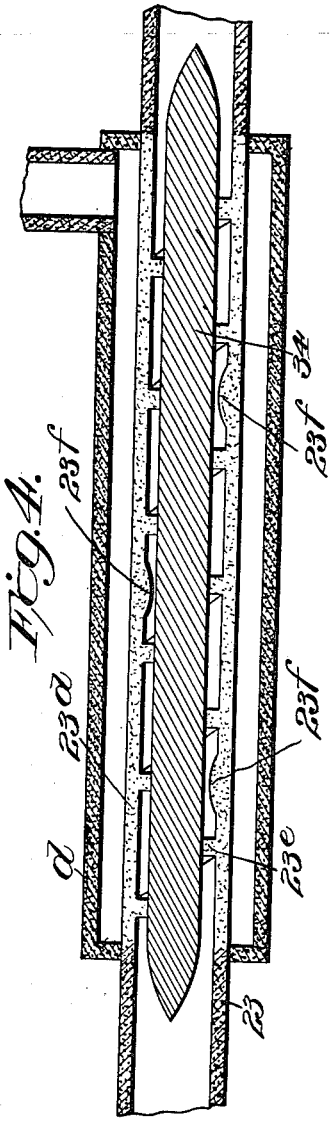

UNITED STATES PATENT OFFICE.

WILLIAM T. HOOFNAGLE, OF GLEN RIDGE, NEW JERSEY.

MEANS FOR SEPARATING MIXED GASES.

1,056,026.  Specification of Letters Patent.  Patented Mar. 18, 1913.

Application filed May 6, 1912. Serial No. 695,490.

*To all whom it may concern:*

Be it known that I, WILLIAM T. HOOFNAGLE, a citizen of the United States, residing at Glen Ridge, in the county of Essex and State of New Jersey, have invented certain new and useful Improvements in Means for Separating Mixed Gases, of which the following is a specification.

This invention comprises improvements in apparatus for dissociating aqueous vapor and for separating the resulting oxygen and hydrogen gases.

In my prior Patents Nos. 956,097 and 1,014,151, I have shown and described a method and apparatus for dissociating vapors, and particularly water vapor, at a pressure considerably below atmospheric pressure and in my present invention I have provided, in connection with an apparatus of this kind, a novel form of separator for the constituent gases and means for returning to the vacuum chamber any vapor which may pass through the apparatus without having been dissociated.

In the accompanying drawing, Figure 1 is a side elevation of an apparatus, embodying my invention, for dissociating water vapor and for separating the resulting gases; Fig. 2 is a top plan view of the condenser and separating apparatus; Fig. 3 is a view showing the separator in a more simplified form, Fig. 4 is a longitudinal section through two of the concentric tubes of the separator illustrating the interior construction, and Fig. 5 is a section on the line 5—5 of Fig. 1.

Referring to Fig. 1 of the drawing, A indicates a closed vessel or vacuum chamber, adapted to contain water or aqueous liquid, this vessel being provided with a heating coil 1, below the level of the liquid, the purpose of this coil being to maintain the temperature of the water above the freezing point, preferably at a temperature of about 40° F. An exhaust pump, indicated in outline at B, has its inlet side connected to the vacuum chamber A by a conduit 2, and when the pump is in action a high vacuum is maintained in the chamber A which causes water vapor to be drawn from said chamber into the conduit. Baffle plates 3, indicated in dotted lines, are arranged in the vacuum chamber to prevent entrained water from being carried out with the vapor. A plurality of tubes 4, of insulating material, such as glass, are arranged in, and form a part of, the conduit 2, and the vapor, passing through the pump, flows through these tubes. At, or near, the ends of the tubes are arranged electrodes 5 and 6, the former being connected by a conductor 7 to a source C of direct electric high tension current, and the latter being connected by a conductor 8 through stationary contact 9 and switch arm 10 to the other side of said source. This switch arm is moved to closed positions temporarily, at the end of the compression stroke of the pump, by a tappet 11 connected with the piston rod and the switch arm is opened automatically by a spring 12 when the tappet and piston rod descend, at the commencement of the suction stroke of the pump. Thus, before the vapor passes into the pump, and while the vapor is stationary in the tubes 4, an electrical discharge takes place between the electrodes in the tubes 4, which results in a decomposition of the water vapor, and the resulting oxygen and hydrogen gases, together with any remaining undecomposed water vapor, flows into the pump from whence it is forced through a pipe 13 into a surface condenser 14. The cooling water for the condenser enters through a pipe 15 and flows out through a pipe 16 and such vapor as may enter the condenser from the compression side of the pump is condensed and drips through a pipe 17 into a tank 18, from whence it may be returned through a pipe 19 to the vacuum chamber A. As the pressure in the chamber A is always lower than the pressure in the tank 18 it will be evident that in order to return the water accumulating in the tank 18 to the chamber A it is only necessary to open, temporarily, the valve 20 in the pipe 19. Gages 21 and 22 on the tank 18 and chamber A, respectively, indicate the water levels and the operator may, at any time, transfer the distilled water from the tank in said chamber, by manipulating the valve 20.

The oxygen and hydrogen gases pass from the condenser into a separating apparatus, indicated at D in Figs. 1 and 2. This separating apparatus comprises a conduit 23 connected at one end to the condenser 14 and at its other end to a pump O. This pipe, in the upper part of the separator, has reverse bends $x$ and $y$ in a horizontal plane, thus providing a considerable length of pipe in a compact space and the parallel portions of the pipe, shown in dotted lines in Fig. 2, are inclosed by casings or jackets $d$, $d'$ and $d^2$ which are connected end to end by pipes 24 and 25. After passing through these jackets the pipe extends in a reverse direction through a similar series of jackets $d^9$ in the lower part of the separator and thence to the pump O. The casings or jackets $d$—$d^2$ are connected by a pipe 26 to the inlet end of a pump 27 and from the outlet or compression end of said pump a pipe 28 extends to a branch $23^a$ of the pipe 23 which branch is also of zig-zag form, the parallel portions of this branch being inclosed in casings or jackets, one of which is indicated at $d^3$. These latter jackets are connected by a pipe 29 to the inlet end of a pump 30 and the outlet port of said pump is connected by a pipe 31 to another branch $23^b$ of the pipe 23, the parallel portions of this branch being inclosed in casings or jackets, one of which is indicated at $d^6$. These latter jackets are connected by a pipe 32 to the jackets $d^9$ and the latter are connected by a pipe 33 to the pump H. The portions of the pipe 23, and its branches, which are inclosed within the casings or jackets are of porous material, preferably a fine clay, through which the hydrogen gas will flow much more freely than the oxygen.

In Fig. 4 the porous portion of one of these pipe sections is indicated at $23^d$. The casings $d$ and all of the portions of the pipe 23 which are exposed to the atmosphere are made of material which is impervious to the gases and for this purpose it is sufficient to make these parts of metal or glazed earthenware, as may be desired. Within the porous portions $23^d$ of the pipe 23 are arranged cylindrical cores, one of which is shown at 34 in Fig. 4, and the interior of the pipe, surrounding the core, is provided with a spiral thread $23^e$ preferably formed upon the interior of the pipe. It will be evident that as the mingled gases are drawn through the pipe 23 they will flow in close contact with the porous tube, as the center of the tube is filled by the core, and the gases will also be subjected to centrifugal action by reason of the spiral passageway between the threads through which the gases must flow. As hereinafter explained a lower pressure is maintained in the jackets than in the pipe 23 and this causes the hydrogen gas to pass through the porous wall of the tube 23, while the oxygen remains in said tube. At suitable intervals, on the inner face of the porous wall, inward projections $23^f$ are preferably placed or formed, the purpose of the projections being to divert the gases inwardly at intervals in their travel whereby the heavier gas will be thrown inwardly with greater force than the lighter gas, causing a partial mechanical separation in the tube, and leaving the lighter gas in contact with the porous wall. These projections may be of any desired form.

In order to make the construction of the separator more readily understood, I have illustrated the same in simplified form in Fig. 3, the reverse bends in the pipe 23 being omitted and a single jacket, instead of three jackets, being shown around each section or branch of the pipe. Referring to Fig. 3, it will be seen that the pipe 23 extends through the uppermost jacket $d$, thence in the reverse direction through the lowermost jacket $d^9$, and thence to the exhaust pump O. The jacket $d$ is connected through pump 27 to the branch $23^a$ of pipe 23 and the jacket $d^3$ is connected through pump 30 to the branch $23^b$ of the pipe 23. The jacket $d^6$ is connected by pipe 32 to the jacket $d^9$ and thence by pipe 33 to the exhaust pump H.

In operation, the pumps O, H, 27 and 30 are all kept in action and the mixed gases are drawn into the pipe 23 from the condenser. The pump 27 maintains a lower pressure in the jackets $d$—$d^2$ than is maintained in the pipe 23 by the pump O; hence in passing through the first series of jackets most of the hydrogen will flow through the porous wall of the inner pipe, while the oxygen and remaining hydrogen will pass onward in the pipe 23. From the jackets $d$—$d^2$ the hydrogen, with whatever oxygen may be mingled with it, is carried into the pump 27 and then passed into the branch pipe $23^a$ which is surrounded by the jackets $d^3$, etc., but the pump 30 maintains a lower pressure in the jackets $d^3$ than is maintained in the branch pipe $23^a$ and hence the hydrogen in the pipe $23^a$ will flow through its porous wall into the jacket, leaving behind the oxygen which passes into the main pipe 23. Thus a separation of the gases drawn into the uppermost series of jackets takes place in the next lower series. This operation is repeated in the third series of jackets $d^6$, the pump 30 exhausting the hydrogen and any oxygen which may be mingled with it from the jackets $d^3$, etc., and forcing them into the branch pipe $23^b$, through the porous walls of which the hydrogen is drawn into the jackets $d^6$ while the oxygen passes on to the main pipe 23. From the jackets $d^6$ the hydrogen passes through pipe 32 to the jackets $d^9$ and thence to the hydrogen pump H, the gas flowing through the pump H being nearly pure hydrogen. As stated, the main separation takes place in the uppermost section of the apparatus, and the hydrogen drawn off is put through two other separating processes in the jackets $d^3$ and $d^6$. The oxygen which remains after these re-separating processes, passes into the pipes $23^a$, so that the product in the pipe $23^a$ when it reaches the lowermost series of the jackets $d^9$ is mainly oxygen with a small percentage of hydrogen. As all of the products in the pipe 23ª pass through the porous section of said pipe in the jackets $d^9$, it will be evident that there will be an extraction of the hydrogen, through the porous walls of the pipe, in these jackets, and hence the gases will be very completely separated, the oxygen flowing into the pump O and thence through its outlet pipe 35 to any suitable receptacle and the hydrogen flowing through the pump H to its outlet pipe 36 and thence to any suitable receptacle.

The arrangement shown in Fig. 4 is very desirable for causing the gases to flow in a thin stream in intimate contact with the porous wall and for preventing the gases from flowing straight through the pipe without coming in contact with the wall.

As the electric decomposing process in the tubes 4 has a tendency to heat the gases in the tubes 4, it is desirable to provide cooling means for chilling, and thereby fixing the gases, and for this purpose, as shown in Figs. 1 and 5, cold water is taken by a pipe 37 from the outlet end of the pipe 1 to a small pump 38, which forces the water through pipe 39, coils 39ª on the tubes 4, and heat-absorbing coils 39ᵇ within the pipe 2, and thence to the inlet end of the heating coil 1. Thus, cold water is taken from the outlet end of the heating coil and after becoming heated in its passage around the tubes 4, and through the absorber 39ᵇ, is returned to the inlet end of coil 1 and serves the purpose of helping to maintain the water in the chamber at a suitable temperature.

What I claim is:

1. The combination with means for decomposing water vapor, and separating means for the gases, of a condenser connected between the decomposing and separating means.

2. A separator for mixed gases comprising a main conduit adapted to receive the mixed gases, said conduit having one or more branches or chambers, an exhaust pump connected to said conduit, means for withdrawing gas from said main conduit through a porous wall and for returning the gas to one of said branches, and means for withdrawing gas from said latter branch through a porous wall.

3. A separator for mixed gases comprising a main conduit for the mixed gases and a branch conduit connected to said main conduit, said conduits having porous portions, jackets inclosing said porous portions, a pump connected between the branch conduit and the jacket on the main conduit, and an exhaust pump connected to the jacket on the branch conduit.

4. A separator for mixed gases comprising a main conduit for the mixed gases and a branch conduit connected to said main conduit, said conduits having porous portions, jackets inclosing said porous portions, a pump connected between the branch conduit and the jacket on the main conduit, an exhaust pump connected to the main conduit and an exhaust pump connected to the jacket on the branch conduit.

5. A separator for mixed gases comprising a main conduit for the mixed gases, a series of branch conduits connected to said main conduit, said main and branch conduits having porous portions, jackets surrounding said porous portions, a pump connected between a first branch conduit of the series and the jacket on the main conduit, a pump connected between a second branch conduit of the series and the jacket on said first branch conduit, and an exhaust pump connected to the jacket on said second branch conduit.

6. A separator for mixed gases comprising a main conduit for the mixed gases, and a series of branch conduits connected to said main conduit, said branch and main conduits having porous portions, jackets surrounding said porous portions, a pump connected between the jackets on the main conduit and one of said branch conduits, a pump connected between the jacket on the latter branch conduit and a succeeding branch conduit, an exhaust pump connected to the jacket on the last mentioned branch conduit, and an exhaust pump connected to the main conduit.

7. A separator for mixed gases comprising a main conduit having porous portions at two points in its length, branch conduits connected to the main conduit between its porous portions, said branch conduits having porous portions, a series of jackets inclosing said porous portions, a pump connecting one jacket on the main pipe with a branch pipe, a pump connecting the jacket on the latter pipe with a succeeding branch pipe, and an exhaust pump connected to the pipe, and an exhaust pump connected to the jacket on the last mentioned branch and the other jacket on the main pipe.

8. A separator for mixed gases comprising a main conduit having porous portions at two points in its length, branch conduits connected to the main conduit between its porous portions, said branch conduits having porous portions, an exhaust pump connected to said main and branch conduits, a series of jackets inclosing said porous portions, a pump connecting one jacket on the main pipe with a branch pipe, a pump connecting the jacket on the latter pipe with a succeeding branch pipe, and an exhaust pump connected to the jacket on the last mentioned branch and the other jacket on the main pipe.

9. In a separator for mixed gases, a conduit having a porous wall, a core within the conduit, spaced from said wall, a jacket inclosing the porous wall, and means for maintaining a lower pressure in the jacket than in the conduit.

10. In a separator for mixed gases, a conduit having porous wall, a core within the conduit spaced from said wall, means on said wall for deflecting the gases, a jacket inclosing the porous wall, and means for maintaining a lower pressure in the jacket than in the conduit.

11. In a separator for mixed gases, a conduit having a porous wall, means within the conduit for deflecting the gases spirally, a jacket inclosing the porous wall, and means for maintaining a lower pressure in the jacket than in the conduit.

12. In a separator for mixed gases, a conduit having a porous wall, means within the conduit for deflecting the gases spirally, and also for deflecting them inwardly, a jacket inclosing the porous wall, and means for maintaining a lower pressure in the jacket than in the conduit.

In testimony whereof I affix my signature, in presence of two witnesses.

WILLIAM T. HOOFNAGLE.

Witnesses:
M. W. CLEPHANE,
T. R. BRESLAUER.